(12) United States Patent
Lee et al.

(10) Patent No.: US 8,264,656 B2
(45) Date of Patent: Sep. 11, 2012

(54) LIQUID CRYSTAL DISPLAY AND MANUFACTURING METHOD THEREOF

(75) Inventors: Sang-Kueon Lee, Asan-si (KR); Kweon-Sam Hong, Seoul (KR); Hyun Park, Cheonan-si (KR); Seung-Hwan Kim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 571 days.

(21) Appl. No.: 12/507,494

(22) Filed: Jul. 22, 2009

(65) Prior Publication Data

US 2010/0134745 A1    Jun. 3, 2010

(30) Foreign Application Priority Data

Dec. 2, 2008    (KR) ................. 10-2008-0121292

(51) Int. Cl.
*G02F 1/136*    (2006.01)
*G02F 1/1343*    (2006.01)

(52) U.S. Cl. ............ 349/153; 349/42; 349/51; 349/143; 349/149; 349/152; 348/731

(58) Field of Classification Search ............ 349/42, 349/51, 149–153; 348/731
See application file for complete search history.

(56) References Cited

U.S. PATENT DOCUMENTS

| | | | |
|---|---|---|---|
| RE41,176 E * | 3/2010 | Oh-Ide | 349/149 |
| 2003/0122978 A1 * | 7/2003 | Lim | 349/42 |
| 2008/0002134 A1 * | 1/2008 | Jeong | 349/153 |
| 2010/0053459 A1 * | 3/2010 | Matsuda et al. | 348/731 |
| 2010/0066966 A1 * | 3/2010 | Matsuda et al. | 349/143 |

FOREIGN PATENT DOCUMENTS

| | | |
|---|---|---|
| JP | 2004-061548 | 2/2004 |
| KR | 1020060058422 A | 5/2006 |
| KR | 1020070048912 A | 5/2007 |
| KR | 1020070077349 A | 7/2007 |
| KR | 1020080048266 A | 6/2008 |
| KR | 1020080049346 A | 6/2008 |
| KR | 1020080052986 A | 6/2008 |
| KR | 1020080065373 A | 7/2008 |
| KR | 1020080077831 A | 8/2008 |
| KR | 1020080078320 A | 8/2008 |
| KR | 1020080079866 A | 9/2008 |

* cited by examiner

*Primary Examiner* — Huyen Ngo
(74) *Attorney, Agent, or Firm* — Frank Chau & Associates, LLC

(57) ABSTRACT

A liquid crystal display (LCD) includes a first substrate including a display area displaying images and a peripheral area surrounding the display area, a common pad formed in the peripheral area of the first substrate, an insulating layer formed on the common pad and having a common contact hole exposing the common pad, an assistance common pad formed on the insulating layer of the peripheral area and contacting the common pad through the common contact hole, a second substrate corresponding to the first substrate, and a common electrode formed on the second substrate, and a conductive sealant disposed between the assistance common pad and the common electrode of the peripheral area, the conductive sealant electrically connecting the assistance common pad and the common electrode, wherein the common contact hole is disposed between the conductive sealant and the display area.

22 Claims, 5 Drawing Sheets

LIQUID CRYSTAL DISPLAY AND MANUFACTURING METHOD THEREOF

CROSS-REFERENCE TO RELATED APPLICATION

This application claims priority to Korean Patent Application No. 10-20080121292 filed on Dec. 2, 2008, the entire contents of which are incorporated herein by reference.

BACKGROUND OF THE INVENTION (a) Technical Field

The present disclosure relates to a liquid crystal display (LCD) and a manufacturing method thereof, and more particularly to an LCD having a conductive sealant and a manufacturing method thereof.

(b) Discussion of the Related Art

Liquid crystal displays (LCDs) are used in flat panel displays. An LCD includes a pair of panels provided with field-generating electrodes and a liquid crystal (LC) layer interposed between the two panels. The LCD displays images by applying voltages to the field-generating electrodes to generate an electric field in the LC layer that determines the orientations of LC molecules therein to adjust the polarization of incident light.

The LCD includes a display area displaying images and a peripheral area surrounding the display area. Conductive sealants are formed in the peripheral area of the LCD. The conductive sealants can function as a sealant and a part receiving a common voltage. The conductive sealants overlap a contact hole in an insulating layer for connecting a common pad of a lower substrate and a common electrode of an upper substrate. However, when the conductive sealants overlap the contact hole, a height difference occurs between the conductive sealants disposed inside of the contact hole and the conductive sealants disposed outside of the contact hole. The height difference according to positions of the conductive sealants generates a contact deterioration between the common pad and the common electrode, and a gap deterioration between the upper substrate and the lower substrate.

SUMMARY OF THE INVENTION

According to exemplary embodiments of the present invention, a height difference of conductive sealants in an LCD is reduced, thereby preventing the gap deterioration between the upper and lower substrates and minimizing the contact deterioration between the common pad of the lower substrate and the common electrode of the upper substrate.

According to an exemplary embodiment of the present invention, a liquid crystal display (LCD) includes a first substrate including a display area displaying images and a peripheral area surrounding the display area, a common pad formed in the peripheral area of the first substrate; an insulating layer formed on the common pad and having a common contact hole exposing the common pad, an assistance common pad formed on the insulating layer of the peripheral area and contacted with the common pad through the common contact hole, a second substrate corresponding to the first substrate, a common electrode formed on the second substrate; and a conductive sealant disposed between the assistance common pad and the common electrode of the peripheral area, and electrically connecting the assistance common pad and the common electrode to each other, wherein the common contact hole is disposed between the conductive sealant and the display area.

The common contact hole is disposed away from the conductive sealant.

The common contact hole may be disposed between the inside surface of the conductive sealant where the conductive sealant faces the display area, and the display area.

Intervals between the assistance common pad and the common electrode may be uniform.

The common contact hole may be provided as a multiple thereof, and about 3 to about 5 of the common contact holes are provided.

The common contact hole may have a quadrangle shape.

The transverse length or longitudinal length of the common contact hole may be less than the width of the conductive sealant.

The transverse length of the common contact hole may be in the range of about 0.2 mm to about 0.7 mm, and the longitudinal length of the common contact hole may be in the range of about 0.2 mm to about 0.7 mm.

The assistance common pad may include a conductive portion contacted with the conductive sealant, a contact portion contacted with the contact hole, and a connection portion connecting the conductive portion and the contact portion, and the connection portion may be longer than three times the transverse length or longitudinal length of the contact portion.

The shape of the contact portion may be the same as the shape of the common contact hole.

The common pad may be formed with the same layer as a gate line of the pixel area.

The assistance common pad may be formed with the same layer as a pixel electrode of the pixel area.

The insulating layer may include a gate insulating layer covering the gate line and a protective layer covering the gate insulating layer.

The conductive sealant may include conductive balls made of a conductive material and the conductive balls may be contacted with the assistance common pad and the common electrode.

The conductive balls may be made of a sphere-shaped material including Au with a diameter of about 6 to about 7 µm.

According to an exemplary embodiment of the present invention, a method for manufacturing a liquid crystal display (LCD) includes forming a common pad in the peripheral area of the first substrate, forming an insulating layer on the common pad and having a common contact hole exposing the common pad, forming an assistance common pad contacted with the common pad through the common contact hole on the insulating layer of the peripheral area; forming a common electrode on the second substrate, and forming a conductive sealant disposed between the assistance common pad and the common electrode of the peripheral area, and electrically connecting the assistance common pad and the common electrode to each other, wherein the common contact hole is disposed between the conductive sealant and the display area.

The interval between the assistance common pad and the common electrode may be uniform.

The number common contact holes may be 3 to 5, and each common contact hole may have a quadrangular shape.

The transverse length of the common contact hole may be in the range of about 0.2 mm to about 0.7 mm, and the longitudinal length of the common contact hole may be in the range of about 0.2 mm to about 0.7 mm.

A gate line may be formed in the pixel area when forming the common pad.

A pixel electrode may be formed in the pixel area when forming the assistance common pad.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF EXEMPLARY EMBODIMENTS

The present invention will be described more fully hereinafter with reference to the accompanying drawings, in which exemplary embodiments of the invention are shown. This invention may, however, be embodied in many different forms and should not be construed as limited to the exemplary embodiments set forth herein.

It will be understood that when an element such as a layer, film, region, or substrate is referred to as being "on" another element, it can be directly on the other element or intervening elements may also be present.

Figure 1:
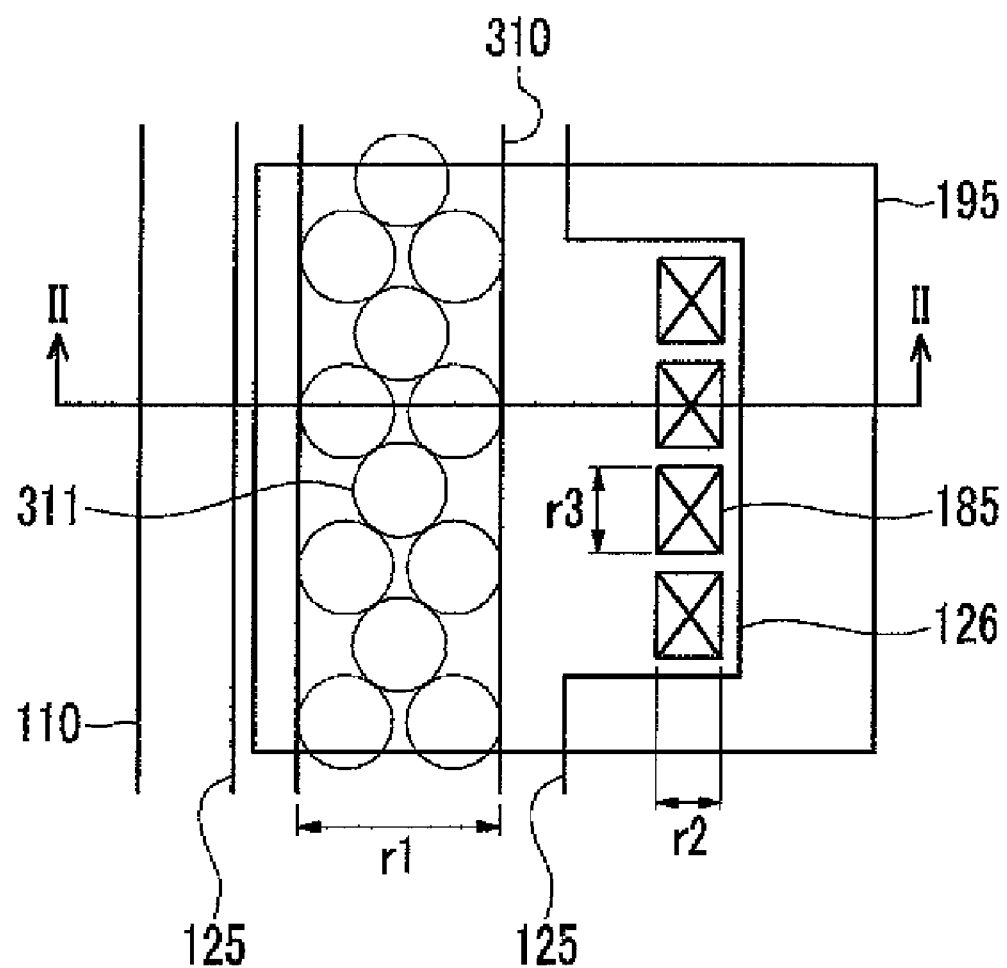
FIG. 1 is a layout view of a peripheral area of a liquid crystal display (LCD) according to an exemplary embodiment of the present invention.
Figure 2:
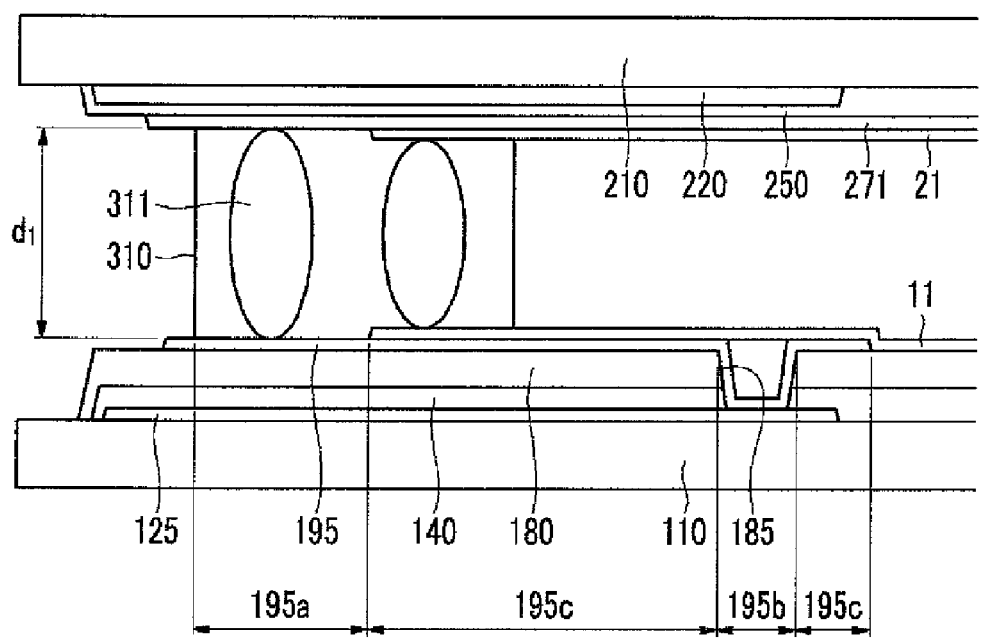
FIG. 2 is a cross-sectional view taken along the line II-II of FIG. 1 according to an exemplary embodiment of the present invention.

FIG. 1 is a layout view of a peripheral area of a liquid crystal display (LCD) according to an exemplary embodiment of the present invention. FIG. 2 is a cross-sectional view taken along the line II-II of FIG. 1 according to an exemplary embodiment of the present invention.

A liquid crystal display (LCD) according to an exemplary embodiment of the present invention includes a display area displaying images, and a peripheral area surrounding the display area. Referring to FIG. 1 and FIG. 2, a common pad 125 is formed in the peripheral area of a lower substrate 110 comprising, for example transparent glass. The common pad 125 is extended in a predetermined direction and includes a protruding portion 126 protruding toward the display area. The common pad 125 is applied with the same voltage as a common voltage Vcom applied to a common electrode 271 of an upper substrate 210.

A gate insulating layer 140 comprising, for example, silicon nitride (SiNx) and a protective layer 180 comprising, for example, silicon nitride or silicon oxide are formed on the common pad 125 The gate insulating layer 140 and the protective layer 180 have a plurality of common contact holes 185 exposing the protruding portion 126 of the common pad 125. The common contact holes 185 are disposed with a predetermined interval therebetween, and the number thereof can be about 3 to about 5. When the number of common contact holes 185 is less than 3, contact deterioration may occur, and when the number of common contact holes 185 is greater than 5, the peripheral area is complicated by unnecessary common contact holes 185.

Exemplary shapes of the common contact hole 185 can be a quadrangle, or a polygon shape, and the size of each common contact hole 185 may be different.

The transverse length r2 or the longitudinal length r3 of the common contact holes 185 can be less than the width r1 of a conductive sealant 310. When the width r1 of the conductive sealant 310 is about 1.2 mm, the transverse length r2 of the contact hole 185 can be in the range of about 0.2 mm to about 0.7 mm and that the longitudinal length r3 of the common contact hole 185 can be in the range of about 0.2 mm to about 0.7 mm.

In an exemplary embodiment, the size of the common contact hole 185 is reduced, and the number of common contact holes 185 is increased to thereby prevent the contact deterioration. That is, although the contact deterioration for one common contact hole 185 is generated, for example, during a manufacturing process or by a disconnection due to Joule heat, the contact is maintained through the other common contact holes 185 such that the contact deterioration may be prevented.

Assistance common pads 195 comprising, for example, ITO or IZO are formed on the protective layer 180 of the peripheral area and in the common contact holes 185. The assistance common pads 195 contact the common pad 125 through the common contact holes 185. Accordingly, a common voltage applied to the common pad 125 is transmitted to the assistance common pad 195 through the common contact hole 185.

An alignment layer 11 is formed on a portion of the assistance common pad 195 and the protective layer 180.

The conductive sealant 310 is formed according to the peripheral area of the liquid crystal display (LCD), and the conductive sealant 310 is formed on the assistance common pad 195 and an end portion of the lower alignment layer 11. The conductive sealant 310 includes a plurality of conductive balls 311 comprising a conductive material. The common voltage applied to the common pad 125 is transmitted to the common electrode 271 of the upper substrate 210 through the assistance common pad 195 and the conductive sealant 310.

The assistance common pad 195 includes a conductive portion 195a directly contacting the conductive sealant 310, a contact portion 195b contacting the common contact hole 185, and a connection portion 195c for connecting the conductive portion 195a and the contact portion 195b. The conductive portion 195a is flat without protrusions and depressions. The shape of the contact portion 195b can be the same as the shape of the common contact hole 185. The connection portion 195c can be disposed under the lower alignment layer 11 such that the connection portion 195c does not contact the conductive balls 311 of the conductive sealant 310. The connection portion 195c can be longer than about three times the transverse length r2 or the longitudinal length r3 of the contact portion 195b according to an exemplary embodiment of the present invention. This is because the assistance common pad 195 comprises, for example, ITO or IZO having a thin thickness. As such, the contact portion 195b and the connection portion 195c of the assistance common pad 195 can be disconnected by the Joule heat, and accordingly the area of the assistance common pad 195 is extended for preventing the disconnection. When the connection portion 195c is longer than about three times the transverse length r2 or the longitudinal length r3 of the contact portion 195b, even if the contact portion 195b is disconnected, the entire connection portions 195c may not be disconnected such that the contact deterioration can be prevented.

The upper substrate 210 facing the lower substrate 110 is disposed on the lower substrate 110. A light blocking member 220 is formed in the peripheral area of the upper substrate 210. An overcoat 250 is formed on the light blocking member 220. The overcoat 250 may comprise an organic insulating material, and prevents the color filters 230 from being exposed. The overcoat 250 provides a flat surface. The common electrode 271 comprising, for example, a transparent conductive material such as ITO and IZO is formed on the overcoat 250.

Figure 3:
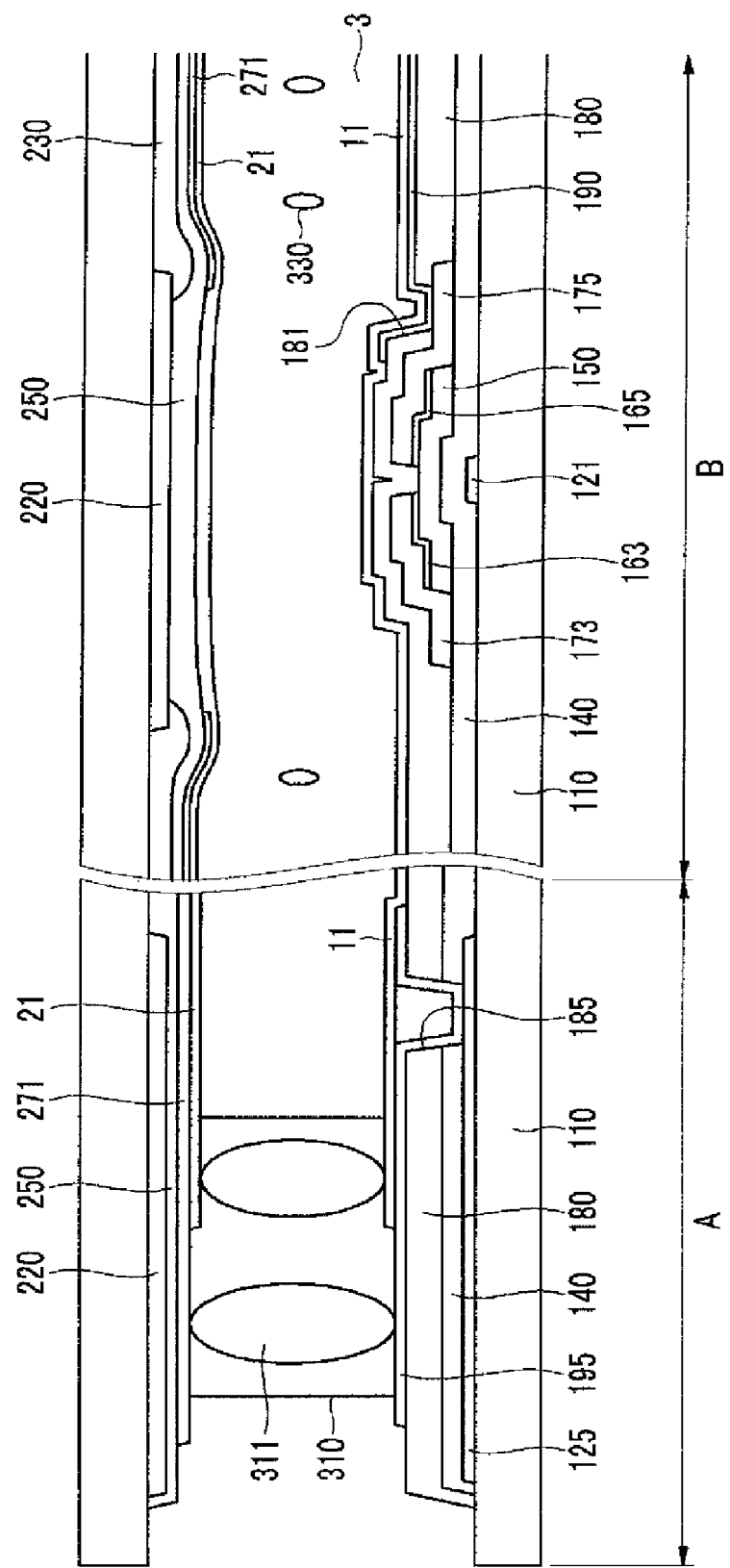
FIG. 3 is a cross-sectional view of a liquid crystal display (LCD) according to an exemplary embodiment of the present invention.

Referring to FIGS. 2 and 3, an upper alignment layer 21 for aligning liquid crystal molecules 330 of a liquid crystal layer 3 in a predetermined direction is formed on the common electrode 271.

The conductive sealant 310 is disposed between the assistance common pad 195 of the peripheral area and the common electrode 271, and electrically connects the assistance common pad 195 and the common electrode 271. That is, the upper surface of the conductive balls 311 disposed in the conductive sealant 310 contacts the assistance common pad 195, and the lower surface of the conductive balls 311 disposed in the conductive sealant 310 contacts the common electrode 271 such that the conductive sealant 310 electrically connects the assistance common pad 195 and the common electrode 271. In an exemplary embodiment, the conductive ball 311 is a sphere-shaped material comprising gold (Au), and the diameter thereof is in the range of about 6 μm to about 7 μm.

The common contact holes 185 are disposed between the display area and the conductive sealant 310. Accordingly, the common contact hole 185 does not overlap the conductive sealant 310 such that the height difference at the inner portion of the conductive sealant 310 is not generated. Accordingly, the interval d1 between the assistance common pad 195 and the common electrode 271 is uniform. In the conventional art, the common contact hole 185 and the conductive sealant 310 partially overlap each other such that the height difference is generated inside the conductive sealant 310, and some of the conductive balls 311 in the conductive sealant 310 do not contact the common electrode 271 such that the contact deterioration is generated. When the size of the conductive balls 311 is increased to prevent the contact deterioration such that the gap between the upper substrate 210 and the lower substrate 110 is less than the size of the conductive balls 311, the conductive sealant 310 is damaged by the conductive balls 311 and the gap deterioration between the upper substrate 210 and the lower substrate 110 is generated.

However, in an exemplary embodiment of the present invention, the conductive sealant 310 does not overlap the common contact hole 185 such that the height difference is not generated in the conductive sealant 310. As such, the contact deterioration between the conductive sealant 310 and the common electrode 271 may be prevented. According to an exemplary embodiment of the present invention, damage to the conductive sealant 310 by the conductive balls 311 and the gap deterioration between the upper substrate 210 and the lower substrate 110 may be prevented. Accordingly, the common voltage applied from the common pad 125 is transmitted to the common electrode 271 without a signal distortion, and the conductive sealant 310 is used without the contact deterioration such that the distance from the outer part of the peripheral area to the display area may be reduced in the liquid crystal display (LCD). As such, according to an exemplary embodiment, the size of the peripheral area can be reduced.

FIG. 3 is a cross-sectional view of a liquid crystal display (LCD) according to an exemplary embodiment of the present invention.

Referring to FIG. 3, a liquid crystal display (LCD) includes the lower substrate 110 and the upper substrate 210, and a liquid crystal layer 3 interposed therebetween. The liquid crystal display (LCD) includes a display area B for displaying the images and a peripheral area A adjacent to the display area B.

A gate line 121 and the common pad 125 are formed on the lower substrate 110. The gate line 121 transmitting a gate signal is disposed in the display area B, and is extended in the transverse direction. The common pad 125 is disposed in the peripheral area A, is extended in a predetermined direction, and includes the protruding portion 126 protruding toward the display area. The common pad 125 is applied with the common voltage Vcom.

The gate line 121 and the common pad 125 may have a multilayered structure including two conductive layers having different physical characteristics. The gate insulating layer 140 comprising, for example, silicon nitride (SiNx) is formed on the gate line 121 and the common pad 125.

A semiconductor 150 layer comprising, for example, hydrogenated amorphous silicon (a-Si) or polysilicon is formed on the gate insulating layer 140.

A plurality of pairs of ohmic contacts 163 and 165 are formed on the semiconductor layer 151, and the ohmic contacts 163 and 165 may comprise, for example, n+ hydrogenated amorphous silicon in which an n-type impurity such as phosphorus is doped with a high concentration, or silicide.

A data line including a source electrode 173 and a drain electrode 175 are formed on the ohmic contacts 163 and 165 and the gate insulating layer 140. The data line transmits the data signal and extends in the longitudinal direction, thereby intersecting the gate line 121. The gate electrode, the source electrode 173, and the drain electrode 175 form a thin film transistor (TFT) along with the semiconductor layer 150. The channel of the in film transistor is formed in the semiconductor layer 150 between the source electrode 173 and the drain electrode 175.

The ohmic contacts 163 and 165 are interposed only between the underlying semiconductor layer 150 and the overlying source electrode 173 and drain electrode 175 thereon, and reduce the contact resistance therebetween. The source electrode 173 and the drain electrode 175 may have a multilayered structure including a refractory metal layer and a conductive layer having low resistance.

The protective layer 180 comprising, for example, silicon nitride or silicon oxide is formed on the source electrode 173, the drain electrode 175, and the exposed semiconductor layer 150. In the peripheral area A, the protective layer 180 is disposed on the gate insulating layer 140. The protective layer 180 has a contact hole 181 connecting the drain electrode 175 and a pixel electrode 190, and the common contact hole 185 exposing the protruding portion 126 of the common pad 125.

The pixel electrode 190 is formed on the protective layer 180. An assistance common pad 195 comprising, for example, ITO or IZO is formed on the protective layer 180 of the peripheral area A and at the inside of the common contact hole 185. The assistance common pad 195 contacts the common pad 125 through the common contact hole 185. The pixel electrode 190, assistance common pad 195 and common pad 125 may comprise a transparent conductive material such as ITO or IZO, or a reflective metal such as aluminum, silver, or alloys thereof.

The lower alignment layer 11 for aligning the liquid crystal molecules 330 of the liquid crystal layer 3 in a predetermined direction is formed on a portion of the pixel electrode 190 and the assistance common pad 195, and the protective layer 180.

The conductive sealant 310 is formed on the assistance common pad 195 and the end portion of the lower alignment layer 11. The conductive sealant 310 includes a plurality of conductive balls 311 comprising the conductive material. The common voltage applied to the common pad 125 is transmitted to the common electrode 271 of the upper substrate 210 through the assistance common pad 195 and the conductive sealant 310.

The upper substrate 210 facing the lower substrate 110 is disposed on the lower substrate 110. The light blocking member 220 for preventing light leakage is formed in the peripheral area A of the upper substrate 210. The color filter 230 is formed on the light blocking member 220. The color filter 230 is disposed substantially in the region enclosed by the light blocking member 220 and may extend along the column of the pixel electrode 190 in the longitudinal direction. The color filter 230 may display one of three primary colors including red, green, and blue.

The overcoat 250 is formed on the color filter 230 and the light blocking member 220. The overcoat 250 may comprise an organic insulating material, and prevents the color filter 230 from being exposed. The overcoat 250 provides the flat surface. The common electrode 271 comprising a transparent conductor such as, for example, ITO or IZO is formed on the overcoat 250.

The upper alignment layer 21 for aligning the liquid crystal 330 of the liquid crystal layer 3 in a predetermined direction is formed on the common electrode 271.

The conductive sealant 310 is disposed between the assistance common pad 195 of the peripheral area A and the common electrode 271. The conductive sealant 310 electrically connects the assistance common pad 195 and the common electrode 271. That is, the upper surface of the conductive balls 311 disposed at the inside of the conductive sealant 310 contacts the assistance common pad 195, and the lower surface of the conductive balls 311 disposed at the inside of the conductive sealant 310 contacts the common electrode 271 such that the conductive sealant 310 electrically connects the assistance common pad 195 and the common electrode 271.

The common contact hole 185 is disposed between the display area B and the conductive sealant 310. Accordingly, the common contact hole 185 does not overlap the conductive sealant 310 such that the height difference is not generated at the inside of the conductive sealant 310. Accordingly, the interval d1 between the assistance common pad 195 and the common electrode 271 is uniform.

Figure 4:
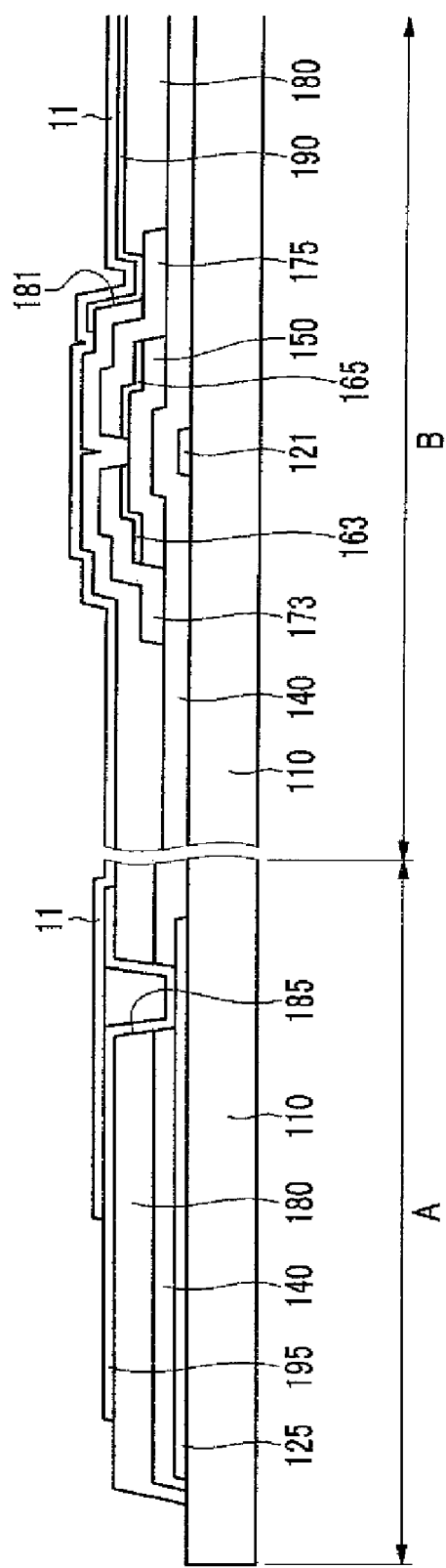
FIG. 4 and FIG. 5 are cross-sectional views of a liquid crystal display (LCD) according to an exemplary embodiment of the present invention.
Figure 5:
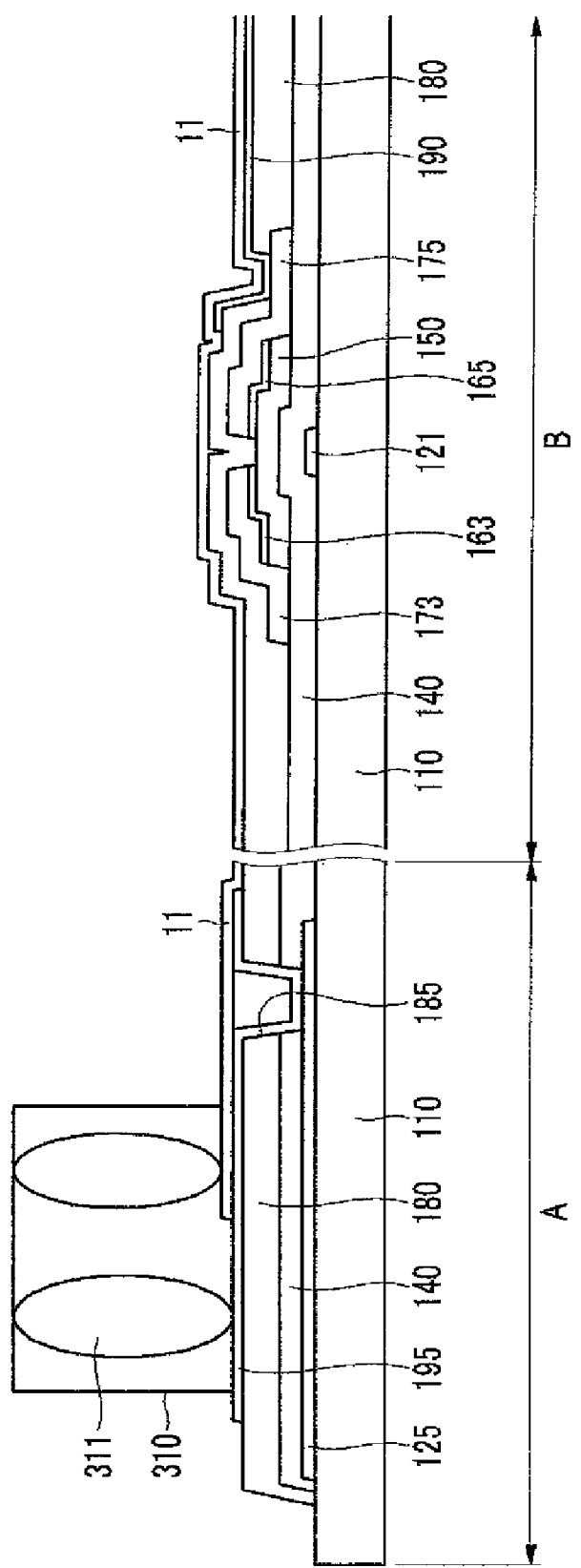

FIG. 4 and FIG. 5 are cross-sectional views showing a method of manufacturing a liquid crystal display (LCD) according to an exemplary embodiment of the present invention.

Referring to FIG. 4, a metal layer such as, for example, aluminum-neodymium (AlNd) or molybdenum (Mo) is deposited on the lower substrate 110, and is patterned by photolithography to form the gate line 121 including a gate electrode, and the common pad 125.

The gate insulating layer 140 comprising, for example, silicon oxide is formed on the gate line 121 and the common pad 125. An amorphous silicon layer that is not doped with an impurity and an amorphous silicon layer that is doped with impurity are sequentially deposited and patterned to form an ohmic contact pattern and the semiconductor layer 150. A conductive material is deposited on the ohmic contact pattern and patterned to form a data line including the source electrode 173 and the drain electrode 175. The ohmic contact pattern is etched by using the source electrode 173 and the drain electrode 175 as a mask to form the ohmic contacts 163 and 165. The semiconductor layer 150, the ohmic contacts 163 and 165, the source electrode 173, and the drain electrode 175 may be respectively formed by an etch mask. In an exemplary embodiment, the semiconductor layer 150, the ohmic contacts 163 and 165, the source electrode 173, and the drain electrode 175 may be formed together by using a photoresist pattern having different thicknesses depending on positions or formed through a slit mask. In an exemplary embodiment, the ohmic contacts 163 and 165 and the data line and drain electrode 175 have the same plane shape. The protective layer 180 including the contact hole 181 and the common contact hole 185 is formed on the source electrode and the drain electrode 175. The common contact hole 185 is disposed near the display area B. A pixel electrode 190 connected to the drain electrode 175 through the contact hole 181 and the assistance common pad 195 connected to the common pad 125 through the common contact hole 185 are formed on the protective layer 180. The lower alignment layer 11 is formed on the pixel electrode 190, a portion of the assistance common pad 195, and the protective layer 180.

Referring to FIG. 5, the conductive sealant 310 is formed on the assistance common pad 195 and the end portion of the lower alignment layer 11. The conductive sealant 310 is formed outside of the common contact hole 185 such that the conductive sealant 310 does not overlap the common contact hole 185. Referring to FIG. 3, the light blocking member 220 is formed in the peripheral area A and a portion of the display area B of the upper substrate 210. The color filter 230 is formed on the light blocking member 220 and the upper substrate 210, and the overcoat 250 is formed on the color filter 230 and the light blocking member 220. The common electrode 271 comprising a transparent conductor such as ITO or IZO is formed on the overcoat 250, and the upper alignment layer 21 for aligning the liquid crystal 330 of the liquid crystal layer 3 in a predetermined direction is formed on the common electrode 271. The upper substrate 210 including the light blocking member 220, the color filter 230, the overcoat 250, the common electrode 271, and the upper alignment layer 21 is positioned on the lower substrate 110. Then, the conductive sealant 310 and the common electrode 271 are contacted with each other. Accordingly, the common voltage applied to the common pad 125 is transmitted to the common electrode 271 of the upper substrate 110 through the assistance common pad 195 and the conductive sealant 310.

According to an exemplary embodiment of the present invention, the common contact hole is disposed between the conductive sealant and the display area such that the conductive sealant does not overlap the common contact hole, and thereby the height difference is not generated inside the conductive sealant.

Accordingly, damage to the conductive sealant may be prevented, and gap deterioration between the upper substrate and the lower substrate may be prevented. The height difference is not generated inside the conductive sealant such that the contact deterioration may be prevented between the conductive sealant and the common pad, and the common electrode. The conductive sealant may be used without contact deterioration such that the distance from the outer part of the frame of the liquid crystal display (LCD) to the display area may be reduced.

Although the exemplary embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A liquid crystal display (LCD) comprising:
a first substrate including a display area displaying images and a peripheral area surrounding the display area;
a common pad formed in the peripheral area of the first substrate;
an insulating layer formed on the common pad and having a common contact hole exposing the common pad;
an assistance common pad formed on the insulating layer at the peripheral area and contacting the common pad through the common contact hole;
a second substrate corresponding to the first substrate; and
a common electrode formed on the second substrate; and
a conductive sealant disposed between the assistance common pad and the common electrode at the peripheral area, the conductive sealant electrically connecting the assistance common pad and the common electrode, wherein the common contact hole is disposed between the conductive sealant and the display area, wherein the assistance common pad includes a conductive portion contacting the conductive sealant, a contact portion contacting the common contact hole, and a connection portion connecting the conductive portion and the contact portion, and the connection portion is longer than three times a transverse length or longitudinal length of the contact portion.

2. The liquid crystal display (LCD) of claim 1, wherein the common contact hole is disposed away from the conductive sealant.

3. The liquid crystal display (LCD) of claim 2, wherein the common contact hole is disposed between the display area and the conductive sealant.

4. The liquid crystal display (LCD) of claim 3, wherein intervals between the assistance common pad and the common electrode are uniform.

5. The liquid crystal display (LCD) of claim 4, wherein more than one common contact holes are provided.

6. The liquid crystal display (LCD) of claim 5, wherein about 3 to about 5 common contact holes are formed.

7. The liquid crystal display (LCD) of claim 6, wherein the common contact hole has a quadrangle shape.

8. The liquid crystal display (LCD) of claim 7, wherein a transverse length or longitudinal length of the common contact hole is less than the width of the conductive sealant.

9. The liquid crystal display (LCD) of claim 8, wherein the transverse length of the common contact hole is in the range of about 0.2 mm to about 0.7 mm, and the longitudinal length of the common contact hole is in the range of about 0.2 mm to about 0.7 mm.

10. The liquid crystal display (LCD) of claim 1, wherein a shape of the contact portion is the same as a shape of the common contact hole.

11. The liquid crystal display (LCD) of claim 1, wherein the common pad is formed with the same layer as a gate line of a pixel area.

12. The liquid crystal display (LCD) of claim 1, wherein the assistance common pad is formed with the same layer as a pixel electrode of the pixel area.

13. The liquid crystal display (LCD) of claim 11, wherein the insulating layer includes a gate insulating layer covering the gate line and a protective layer covering the gate insulating layer.

14. The liquid crystal display (LCD) of claim 1, wherein:
the conductive sealant includes conductive balls comprising a conductive material; and
the conductive balls contact the assistance common pad and the common electrode.

15. The liquid crystal display (LCD) of claim 14, wherein the conductive balls have a diameter of about 6 μm to about 7 μm and comprise gold (Au).

16. A method for manufacturing a liquid crystal display (LCD), comprising:
forming a common pad in a peripheral area of a first substrate;
forming an insulating layer on the common pad, the insulating layer having a common contact hole exposing the common pad;
forming an assistance common pad on the insulating layer at the peripheral area, the assistance common pad contacting the common pad through the common contact hole;
forming a common electrode on a second substrate; and
forming a conductive sealant disposed between the assistance common pad and the common electrode at the peripheral area, and electrically connecting the assistance common pad and the common electrode, wherein the common contact hole is disposed between the conductive sealant and a display area of the substrate, wherein the assistance common pad includes a conductive portion contacting the conductive sealant, a contact portion contacting the common contact hole, and a connection portion connecting the conductive portion and the contact portion, and the connection portion is longer than three times a transverse length or longitudinal length of the contact portion.

17. The method of claim 16, wherein intervals between the assistance common pad and the common electrode are uniform.

18. The method of claim 17, wherein about 3 to about 5 common contact holes are formed.

19. The method of claim 18, wherein the common contact hole has a quadrangular shape.

20. The method of claim 19, wherein a transverse length of the common contact hole is in the range of about 0.2 mm to about 0.7 mm, and a longitudinal length of the common contact hole is in the range of about 0.2 mm to about 0.7 mm.

21. The method of claim 16, wherein a gate line is formed in a pixel area when forming the common pad.

22. The method of claim 21, wherein a pixel electrode is formed in the pixel area when forming the assistance common pad.

* * * * *